United States Patent
Wang et al.

(10) Patent No.: US 9,497,716 B2
(45) Date of Patent: Nov. 15, 2016

(54) CONTROL METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventors: Liming Wang, Beijing (CN); Zhijun Chen, Beijing (CN)

(73) Assignees: LENOVO (BEIJING) LIMITED, Beijing (CN); BEIJING LENONO SOFTWARE LTD., Beijing (CN)

( * ) Notice: Subject to any disclaimer, the term of this patent is extended or adjusted under 35 U.S.C. 154(b) by 0 days.

(21) Appl. No.: 14/491,213

(22) Filed: Sep. 19, 2014

(65) Prior Publication Data

US 2015/0264654 A1    Sep. 17, 2015

(30) Foreign Application Priority Data

Mar. 17, 2014   (CN) .......................... 2014 1 0099356

(51) Int. Cl.
*H04W 52/24* (2009.01)
*H04W 52/02* (2009.01)
*H04W 52/28* (2009.01)

(52) U.S. Cl.
CPC ....... *H04W 52/248* (2013.01); *H04W 52/0209* (2013.01); *H04W 52/0241* (2013.01); *H04W 52/0245* (2013.01); *H04W 52/283* (2013.01)

(58) Field of Classification Search
CPC .............................. H04W 4/00; H04W 40/38
See application file for complete search history.

(56) References Cited

U.S. PATENT DOCUMENTS

| | | | | |
|---|---|---|---|---|
| 2004/0201545 | A1* | 10/2004 | Yamazaki | G06F 3/1423 345/1.1 |
| 2008/0238893 | A1* | 10/2008 | Ishii | H04N 5/2251 345/204 |
| 2011/0015796 | A1* | 1/2011 | Heydron | G08C 17/02 700/286 |
| 2014/0064258 | A1* | 3/2014 | Montag | H04W 84/12 370/338 |
| 2014/0210740 | A1* | 7/2014 | Lee | G06F 3/0488 345/173 |
| 2015/0279335 | A1* | 10/2015 | Ripp | G09G 5/26 345/428 |

* cited by examiner

*Primary Examiner* — Bobbak Safaipour
(74) *Attorney, Agent, or Firm* — Scully Scott Murphy & Presser

(57) ABSTRACT

The present disclosure provides a control method and an electronic device. The electronic device comprises a first body, a second body and a sensor unit. The first body has a first communication unit, the second body has a second communication unit, the first body and the second body communicate with each other through the first and second communication units. A relative position between the first body and the second body is changeable. The method comprises: detecting a positional relation between the first body and the second body, determining a distance parameter between the first and second communication units based on the positional relation, and adjusting power of each of the first and second communication units based on the distance parameter between the first and second communication units.

12 Claims, 6 Drawing Sheets

---

301 — Detecting the positional relation between the first body and the second body by using the sensor unit when the first body is detached from the second body 302 — Determining a distance parameter between the first and second communication units based on the positional relation 303 — Adjusting power of each of the first and second communication units based on the determined distance parameter

CONTROL METHOD AND ELECTRONIC DEVICE

CROSS-REFERENCE TO RELATED APPLICATION(S)

This application claims priority to Chinese Application No. 201410099356.5, entitled "CONTROL METHOD AND ELECTRONIC DEVICE", filed on Mar. 17, 2014, which is incorporated herein by reference in their entirety.

TECHNICAL FIELD

The present disclosure relates to control technology, and more particularly, to a control method and an electronic device.

BACKGROUND

With the diversification of notebook computers, detachable notebook computers, e.g., Thinkpad Helix or Waltz notebook computers, become more and more popular. In a detachable notebook computer, contents are displayed on a tablet computer which is connected with a keyboard in a detachable manner. That is, a user can attach the keyboard to, or detach it from, the tablet computer. When the keyboard is attached to the tablet computer, they get close to each other and establish a connection with each other via wireless chips, e.g., WaveConnex wireless chips, for data communication. However, when the tablet computer is rotated around the keyboard, the relative position between the tablet computer and the keyboard varies continuously, resulting in a continuous variation of the distance between the wireless chip at the tablet computer and the wireless chip at the keyboard. Hence, the radio frequency (RF) power transmitted between the two wireless chips has to be set to an RF power required for the maximum distance between them, so as to ensure the transmission quality for any arbitrary relative position between the tablet computer and the keyboard. However, the transmission power of the chips is not adaptive to use scenarios, which leads to excessive power consumption of the wireless chips and reduces the battery life of the device.

SUMMARY

In order to solve the above problem, the embodiments of the present disclosure provide a control method and an electronic device.

According to an embodiment of the present disclosure, a method for controlling an electronic device is provided. The method comprises: detecting a positional relation between a first body and a second body of the electronic device, in the case that the relative position between the first body and the second body is changed; determining a distance parameter between a first and a second communication units based on the positional relation, wherein the first communication unit is disposed in the first body, the second communication unit is disposed in the second body; and adjusting power of each of the first and second communication units based on the determined distance parameter.

According to another embodiment of the present disclosure, an electronic device is provided. The electronic device comprises a first body, which comprises a first communication unit; a second body, which comprises a second communication unit; a sensor unit, which detects a positional relation between the first body and second body in the case that the relative position between the first body and the second body is changed; a first determining unit, which determines a distance parameter between the first and second communication units based on the positional relation; and an adjusting unit, which adjusts power of each of the first and second communication units based on the distance parameter.

DETAILED DESCRIPTION OF THE EMBODIMENTS

In the following, the implementation of the present disclosure will be described in detail with reference to the figures, so as to facilitate thorough understanding of the characteristics and technical contents of the present disclosure. The figures are provided for the purpose of illustration only, rather than limiting the present disclosure.

Figure 1:
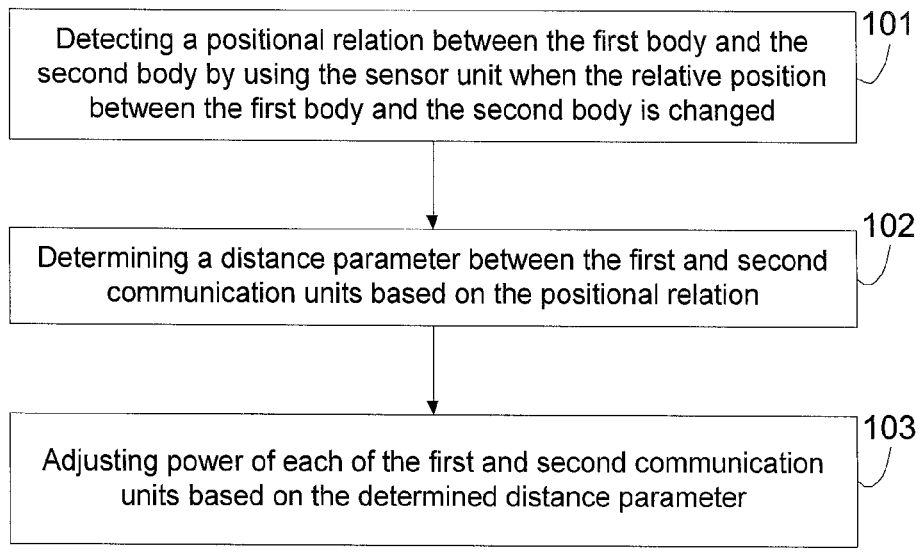
FIG. 1 is a flowchart illustrating a control method according to a first embodiment of the present disclosure.

FIG. 1 is a flowchart illustrating a control method according to a first embodiment of the present disclosure. In this embodiment, the control method is applied in an electronic device including a first body, a second body and a sensor unit. The first body has a first communication unit, the second body has a second communication unit, and the first body and the second body are capable of communicating with each other via the first and second communication units. A relative position between the first body and the second body is changeable. As shown in FIG. 1, the method includes the following steps.

At step 101, a positional relation between the first body and the second body is detected by using the sensor unit if the relative position between the first body and the second body is changed.

In an embodiment of the present disclosure, the electronic device includes a first body and a second body. Here, the first body is connected with the second body in a detachable manner. Hence, the electronic device is a detachable electronic device. The first body is rotatable around the second body. As such, the relative position between the first body and the second body is changeable.

In an embodiment of the present disclosure, the first body may be a tablet computer, a display screen and the like, and the second body may be a keyboard, a control accessory and the like. The first body has a first communication unit and the second body has a second communication unit. Each of the first and second communication units may be a wireless chip, e.g., a WaveConnex wireless chip which may be used for short-range, high speed wireless data transmission at 60 GHz within a transmission distance ranging from 1 mm to 5 mm. Hence, the first and second bodies can communicate with each other in a short range via these two communication units.

In an embodiment of the present disclosure, the relative position between the first and second bodies is changeable. This includes at least the following situations.

The first body is connected with the second body in a rotatable manner. If the first body is rotated around the second body, an angle between the first body and the second body is changed.

If the first body is detached from the second body, the position of the first body relative to the second body is changed.

If the first body is attached to the second body, the position of the first body relative to the second body is changed.

Based on the above situations regarding the changes in the relative position between the first and second bodies, in an embodiment of the present disclosure, the sensor unit is used to detect the current positional relation, e.g., an angle, between the first and second bodies in real time.

In an embodiment of the present disclosure, the positional relation between the first and second bodies may be characterized by an angle parameter or a distance parameter.

In an embodiment of the present disclosure, the sensor unit may include two sensor sub-units, e.g., two gravity sensors (G-sensors). For example, one G-sensor is provided on the first body and the other one is provided on the second body. Orientation parameters of the first and second bodies may be obtained by using the two G-sensors, respectively. Then, the positional relation between the first and second bodies may be determined by comparing the two orientation parameters.

In an embodiment of the present disclosure, the sensor unit may be a distance sensor which may be used to obtain a distance parameter between the first and second bodies directly.

It can be appreciated by those skilled in the art that the sensor unit is not limited to a G-sensor or a distance sensor, and other sensors, e.g., a displacement sensor, may be used.

At step 102, a distance parameter between the first and second communication units is determined based on the positional relation.

In an embodiment of the present disclosure, the positional relation between the first communication unit and the first body and the positional relation between the second communication unit and the second body depend on structure parameters of the electronic device and are known parameters. The positional relation between the first communication unit and the first body and the positional relation between the second communication unit and the second body may be represented by two vectors, respectively. The positional relation, i.e., the distance parameter, between the first and second communication units may be uniquely determined based on the positional relation between the first communication unit and the first body, the positional relation between the second communication unit, and the second body and the positional relation between the first and second bodies.

At step 103, power of each of the first and second communication units is adjusted based on the distance parameter between the first and second communication units.

In an embodiment of the present disclosure, the power of each of the first and second communication units is dependent on the distance between the first and second communication units. In particular, if the distance between the first and second communication units is increased, the power of each of the first and second communication units may be increased to ensure the normal communication between them. If the distance between the first and second communication units is decreased, the power of each of the first and second communication units may be decreased to reduce their power consumptions while guaranteeing the normal communication between them. In this way, the electronic device's battery can last longer.

When adjusting the power of each of the first and second communication units, it is not necessary to increase the powers unlimitedly if the distance between the first and second communication units reaches a particular threshold. For example, when the first body is detached from the second body, the first and second communication units may be disabled. Accordingly, the method further includes: determining whether the distance parameter is larger than or equal to a predetermined threshold or not, and disabling the first and second communication units if the distance parameter is larger than or equal to the predetermined threshold.

Figure 2:
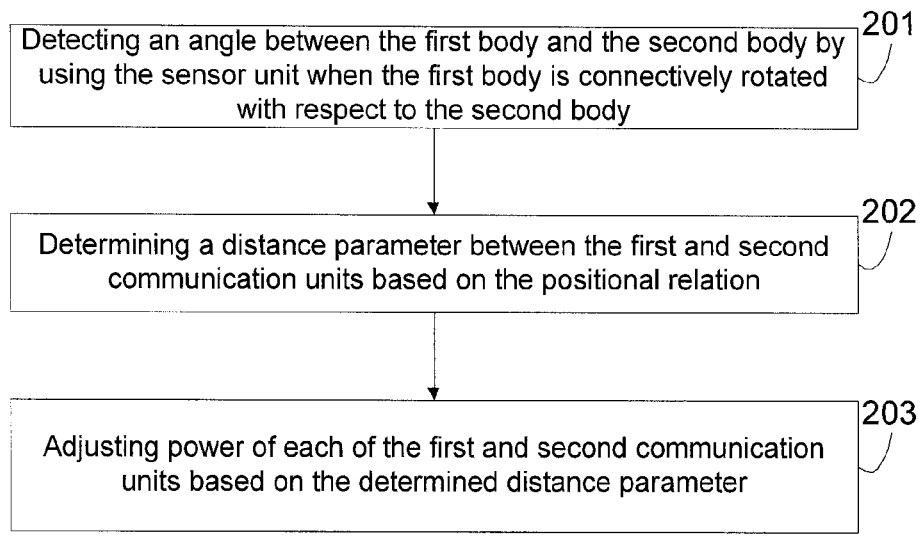
FIG. 2 is a flowchart illustrating a control method according to a second embodiment of the present disclosure.

FIG. 2 is a flowchart illustrating a control method according to a second embodiment of the present disclosure. In this embodiment, the control method is applied in an electronic device including a first body, a second body and a sensor unit. The first body has a first communication unit, the second body has a second communication unit, and the first body and the second body are capable of communicating with each other via the first and second communication units. A relative position between the first body and the second body is changeable. As shown in FIG. 2, the method includes the following steps.

At step 201, if the first body is connectively rotated with respect to the second body, an angle between the first body and the second body is detected by using the sensor unit.

In an embodiment of the present disclosure, the electronic device includes a first body and a second body. Here, the first body is connected with the second body in a detachable manner. Hence, the electronic device is a detachable electronic device. The first body is rotatable around the second body. As such, the angle between the first body and the second body is changeable.

In an embodiment of the present disclosure, the first body may be a tablet computer, a display screen and the like, and the second body may be a keyboard, a control accessory, and the like. The first body has a first communication unit and the second body has a second communication unit. Each of the first and second communication units may be a wireless chip, e.g., a WaveConnex wireless chip which may be used for short-range, high speed wireless data transmission at 60 GHz within a transmission distance ranging from 1 mm to 5 mm. Hence, the first and second bodies may communicate with each other in a short range via these two communication units.

In an embodiment of the present disclosure, the sensor unit may include two sensor sub-units, e.g., two G-sensors.

For example, one G-sensor is provided on the first body and the other one is provided on the second body. Orientation parameters of the first and second bodies may be obtained by using the two G-sensors, respectively. Then, the angle between the first and second bodies may be determined by comparing the two orientation parameters.

At step 202, a distance parameter between the first and second communication units is determined based on the positional relation.

In an embodiment of the present disclosure, the positional relation between the first communication unit and the first body and the positional relation between the second communication unit and the second body depend on structure parameters of the electronic device and are known parameters. The positional relation between the first communication unit and the first body and the positional relation between the second communication unit and the second body may be represented by two vectors, respectively. The positional relation, i.e., the distance parameter, between the first and second communication units may be uniquely determined based on the positional relation between the first communication unit and the first body, the positional relation between the second communication unit and the second body, and the positional relation between the first and second bodies.

At step 203, power of each of the first and second communication units is adjusted based on the distance parameter between the first and second communication units.

In an embodiment of the present disclosure, the power of each of the first and second communication units is dependent on the distance between the first and second communication units. In particular, if the distance between the first and second communication units is increased, the power of each of the first and second communication units may be increased to ensure the normal communication between them. If the distance between the first and second communication units is decreased, the power of each of the first and second communication units may be decreased to reduce their power consumptions while guaranteeing the normal communication between them. In this way, the electronic device's battery can last longer.

When adjusting the power of each of the first and second communication units, it is not necessary to increase the powers unlimitedly if the distance between the first and second communication units reaches a particular threshold. For example, if the first body is detached from the second body, the first and second communication units may be disabled. Accordingly, the method further includes: determining whether the distance parameter is larger than or equal to a predetermined threshold or not, and disabling the first and second communication units if the distance parameter is larger than or equal to the predetermined threshold.

Figure 3:
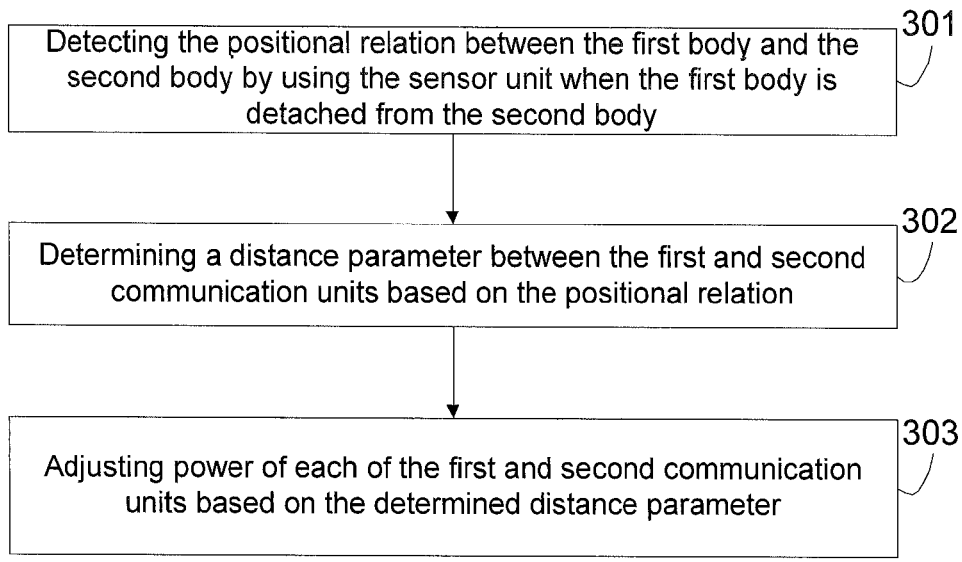
FIG. 3 is a flowchart illustrating a control method according to a third embodiment of the present disclosure.

FIG. 3 is a flowchart illustrating a control method according to a third embodiment of the present disclosure. In this embodiment, the control method is applied in an electronic device including a first body, a second body and a sensor unit. The first body has a first communication unit, the second body has a second communication unit, and the first body and the second body are capable of communicating with each other via the first and second communication units. A relative position between the first body and the second body is changeable. As shown in FIG. 3, the method includes the following steps.

At step 301, if the first body is detached from the second body, the positional relation between the first body and the second body is detected by using the sensor unit.

In an embodiment of the present disclosure, the electronic device includes a first body and a second body. Here, the first body is connected with the second body in a detachable manner. Hence, the electronic device is a detachable electronic device.

In an embodiment of the present disclosure, the first body may be a tablet computer, a display screen and the like, and the second body may be a keyboard, a control accessory and the like. The first body has a first communication unit and the second body has a second communication unit. Each of the first and second communication units may be a wireless chip, e.g., a WaveConnex wireless chip which may be used for short-range, high speed wireless data transmission at 60 GHz within a transmission distance ranging from 1 mm to 5 mm. Hence, the first and second bodies may communicate with each other in a short range via these two communication units.

In an embodiment of the present disclosure, the sensor unit may include two sensor sub-units, e.g., two G-sensors. For example, one G-sensor is provided on the first body and the other one is provided on the second body. Orientation parameters of the first and second bodies may be obtained by using the two G-sensors, respectively. Then, the positional relation between the first and second bodies may be determined by comparing the two orientation parameters.

In an embodiment of the present disclosure, the sensor unit may be a distance sensor which may be used to obtain a distance parameter between the first and second bodies directly.

It can be appreciated by those skilled in the art that the sensor unit is not limited to a G-sensor or a distance sensor, but other sensors, e.g., a displacement sensor, may be used.

At step 302, a distance parameter between the first and second communication units is determined based on the positional relation.

In an embodiment of the present disclosure, the positional relation between the first communication unit and the first body and the positional relation between the second communication unit and the second body depend on structure parameters of the electronic device and are known parameters. The positional relation between the first communication unit and the first body and the positional relation between the second communication unit and the second body may be represented by two vectors, respectively. The positional relation, i.e., the distance parameter, between the first and second communication units may be uniquely determined based on the positional relation between the first communication unit and the first body, the positional relation between the second communication unit and the second body, and the positional relation between the first and second bodies.

At step 303, power of each of the first and second communication units is adjusted based on the distance parameter between the first and second communication units.

In an embodiment of the present disclosure, the power of each of the first and second communication units is dependent on the distance between the first and second communication units. In particular, if the distance between the first and second communication units is increased, the power of each of the first and second communication units may be increased to ensure the normal communication between them. If the distance between the first and second communication units is decreased, the power of each of the first and second communication units may be decreased to reduce their power consumptions while guaranteeing the normal communication between them. In this way, the electronic device's battery can last longer.

When adjusting the power of each of the first and second communication units, it is not necessary to increase the powers unlimitedly if the distance between the first and second communication units reaches a particular threshold. For example, if the first body is detached from the second body, the first and second communication units may be disabled. Accordingly, the method further includes: determining whether the distance parameter is larger than or equal to a predetermined threshold or not, and disabling the first and second communication units if the distance parameter is larger than or equal to the predetermined threshold.

Figure 4:
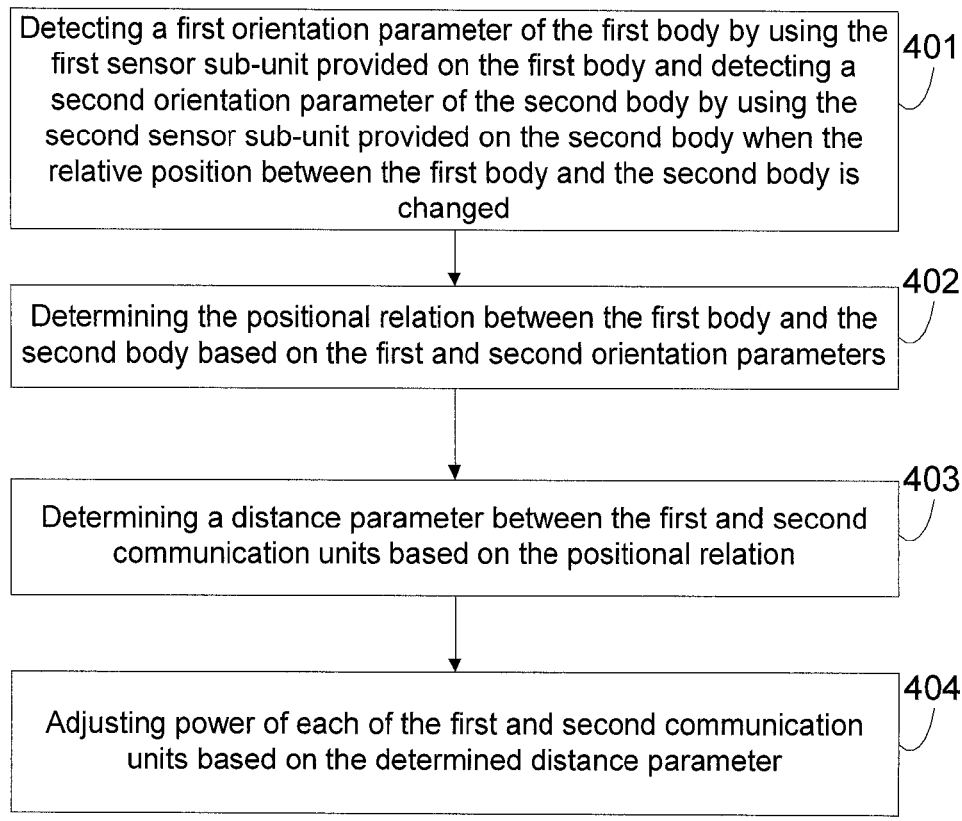
FIG. 4 is a flowchart illustrating a control method according to a fourth embodiment of the present disclosure.

FIG. 4 is a flowchart illustrating a control method according to a fourth embodiment of the present disclosure. In this embodiment, the control method is applied in an electronic device including a first body, a second body and a sensor unit. The sensor unit includes a first sensor sub-unit provided on the first body and a second sensor sub-unit provided on the second body. The first body has a first communication unit, the second body has a second communication unit, and the first body and the second body are capable of communicating with each other via the first and second communication units. A relative position between the first body and the second body is changeable. As shown in FIG. 4, the method includes the following steps.

At step 401, if the relative position between the first body and the second body is changed, a first orientation parameter of the first body is detected by using the first sensor sub-unit provided on the first body and a second orientation parameter of the second body is detected by using the second sensor sub-unit provided on the second body.

In an embodiment of the present disclosure, the electronic device includes a first body and a second body. Here, the first body is connected with the second body in a detachable manner. Hence, the electronic device is a detachable electronic device. The first body is rotatable around the second body. As such, the relative position between the first body and the second body is changeable.

In an embodiment of the present disclosure, the first body may be a tablet computer, a display screen and the like, and the second body may be a keyboard, a control accessory and the like. The first body has a first communication unit and the second body has a second communication unit. Each of the first and second communication units may be a wireless chip, e.g., a WaveConnex wireless chip which may be used for short-range, high speed wireless data transmission at 60 GHz within a transmission distance ranging from 1 mm to 5 mm. Hence, the first and second bodies may communicate with each other in a short range via these two communication units.

In an embodiment of the present disclosure, the relative position between the first and second bodies is changeable. This includes at least the following situations.

The first body is connected with the second body in a rotatable manner. When the first body is rotated around the second body, an angle between the first body and the second body is changed.

If the first body is detached from the second body, the position of the first body relative to the second body is changed.

If the first body is attached to the second body, the position of the first body relative to the second body is changed.

Based on the above situations regarding the changes in the relative position between the first and second bodies, in an embodiment of the present disclosure, the sensor unit is used to detect the current positional relation, e.g., an angle, between the first and second bodies in real time.

In an embodiment of the present disclosure, the positional relation between the first and second bodies may be characterized by an angle parameter or a distance parameter.

In an embodiment of the present disclosure, the sensor unit may include two sensor sub-units, e.g., two G-sensors. For example, one G-sensor is provided on the first body and the other one is provided on the second body. Orientation parameters of the first and second bodies may be obtained by using the two G-sensors, respectively. Then, the positional relation between the first and second bodies may be determined by comparing the two orientation parameters, as shown in step 402 below.

In an embodiment of the present disclosure, the sensor unit may be a distance sensor which may be used to obtain a distance parameter between the first and second bodies directly.

It can be appreciated by those skilled in the art that the sensor unit is not limited to a G-sensor or a distance sensor, but other sensors, e.g., a displacement sensor, may be used.

At step 402, the positional relation between the first body and the second body is determined based on the first and second orientation parameters.

At step 403, a distance parameter between the first and second communication units is determined based on the positional relation.

In an embodiment of the present disclosure, the positional relation between the first communication unit and the first body and the positional relation between the second communication unit and the second body depend on structure parameters of the electronic device and are known parameters. The positional relation between the first communication unit and the first body and the positional relation between the second communication unit and the second body may be represented by two vectors, respectively. The positional relation, i.e., the distance parameter, between the first and second communication units may be uniquely determined based on the positional relation between the first communication unit and the first body, the positional relation between the second communication unit and the second body, and the positional relation between the first and second bodies.

At step 404, power of each of the first and second communication units is adjusted based on the distance parameter between the first and second communication units.

In an embodiment of the present disclosure, the power of each of the first and second communication units is dependent on the distance between the first and second communication units. In particular, if the distance between the first and second communication units is increased, the power of each of the first and second communication units may be increased to ensure the normal communication between them. If the distance between the first and second communication units is decreased, the power of each of the first and second communication units may be decreased to reduce their power consumptions while guaranteeing the normal communication between them. In this way, the electronic device's battery can last longer.

When adjusting the power of each of the first and second communication units, it is not necessary to increase the powers unlimitedly if the distance between the first and second communication units reaches a particular threshold. For example, if the first body is detached from the second body, the first and second communication units may be disabled. Accordingly, the method further includes: determining whether the distance parameter is larger than or equal to a predetermined threshold or not, and disabling the first and second communication units if the distance parameter is larger than or equal to the predetermined threshold.

Figure 5:
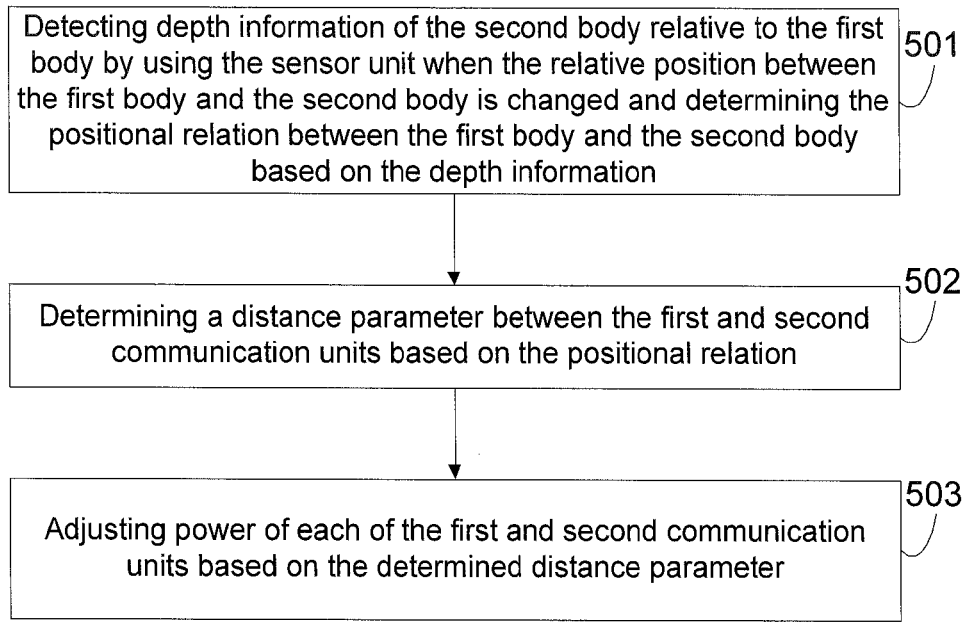
FIG. 5 is a flowchart illustrating a control method according to a fifth embodiment of the present disclosure.

FIG. 5 is a flowchart illustrating a control method according to a fifth embodiment of the present disclosure. In this embodiment, the control method is applied in an electronic device including a first body, a second body and a sensor unit. The first body has a first communication unit, the second body has a second communication unit, and the first body and the second body are capable of communicating with each other via the first and second communication units. A relative position between the first body and the second body is changeable. As shown in FIG. 5, the method includes the following steps.

At step 501, if the relative position between the first body and the second body is changed, depth information of the second body relative to the first body is detected by using the sensor unit, and the positional relation between the first body and the second body is determined based on the depth information.

In an embodiment of the present disclosure, the electronic device includes a first body and a second body. Here, the first body is connected with the second body in a detachable manner. Hence, the electronic device is a detachable electronic device. The first body is rotatable around the second body. As such, the relative position between the first body and the second body is changeable.

In an embodiment of the present disclosure, the first body may be a tablet computer, a display screen and the like, and the second body may be a keyboard, a control accessory and the like. The first body has a first communication unit and the second body has a second communication unit. Each of the first and second communication units may be a wireless chip, e.g., a WaveConnex wireless chip which may be used for short-range, high speed wireless data transmission at 60 GHz within a transmission distance ranging from 1 mm to 5 mm. Hence, the first and second bodies may communicate with each other in a short range via these two communication units.

In an embodiment of the present disclosure, the relative position between the first and second bodies is changeable. This includes at least the following situations.

The first body is connected with the second body in a rotatable manner. If the first body is rotated around the second body, an angle between the first body and the second body is changed.

If the first body is detached from the second body, the position of the first body relative to the second body is changed.

If the first body is attached to the second body, the position of the first body relative to the second body is changed.

In an embodiment of the present disclosure, the positional relation between the first and second bodies may be characterized by a distance parameter corresponding to the depth information.

At step 502, a distance parameter between the first and second communication units is determined based on the positional relation.

In an embodiment of the present disclosure, the positional relation between the first communication unit and the first body and the positional relation between the second communication unit and the second body depend on structure parameters of the electronic device and are known parameters. The positional relation between the first communication unit and the first body and the positional relation between the second communication unit and the second body may be represented by two vectors, respectively. The positional relation, i.e., the distance parameter, between the first and second communication units may be uniquely determined based on the positional relation between the first communication unit and the first body, the positional relation between the second communication unit and the second body, and the positional relation between the first and second bodies.

At step 503, power of each of the first and second communication units is adjusted based on the distance parameter between the first and second communication units.

In an embodiment of the present disclosure, the power of each of the first and second communication units is dependent on the distance between the first and second communication units. In particular, if the distance between the first and second communication units is increased, the power of each of the first and second communication units may be increased to ensure the normal communication between them. If the distance between the first and second communication units is decreased, the power of each of the first and second communication units may be decreased to reduce their power consumptions while guaranteeing the normal communication between them. In this way, the electronic device's battery can last longer.

When adjusting the power of each of the first and second communication units, it is not necessary to increase the powers unlimitedly if the distance between the first and second communication units reaches a particular threshold. For example, if the first body is detached from the second body, the first and second communication units may be disabled. Accordingly, the method further includes: determining whether the distance parameter is larger than or equal to a predetermined threshold or not, and disabling the first and second communication units if the distance parameter is larger than or equal to the predetermined threshold.

Figure 6:
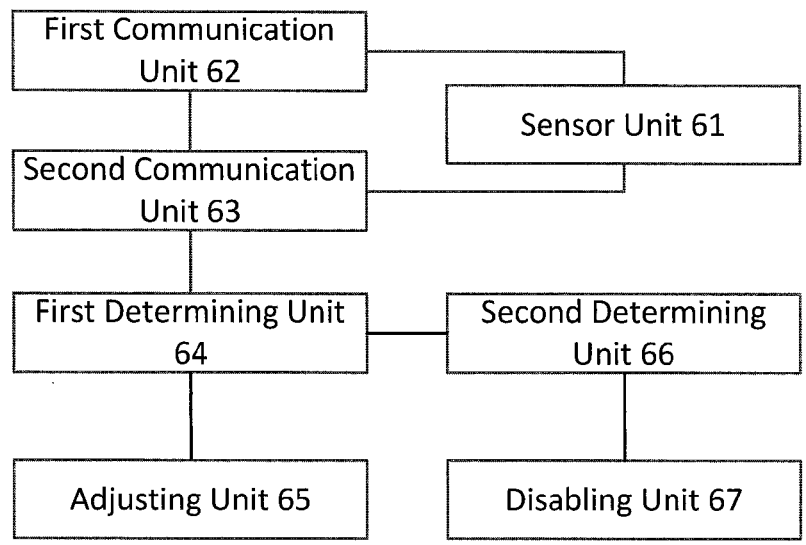
FIG. 6 is a schematic diagram showing a structure of an electronic device according to a first embodiment of the present disclosure.

FIG. 6 is a schematic diagram showing a structure of an electronic device according to a first embodiment of the present disclosure. As shown in FIG. 6, the electronic device includes a first body (not shown), a second body (not shown) and a sensor unit 61. The first body has a first communication unit 62, the second body has a second communication unit 63, and the first body and the second body are capable of communicating with each other via the first 62 and second 63 communication units. A relative position between the first body and the second body is changeable.

The sensor unit 61 is configured to detect a positional relation between the first body and the second body if the relative position between the first body and the second body is changed.

The electronic device further includes a first determining unit 64 configured to determine a distance parameter between the first 62 and the second 63 communication units based on the positional relation.

The electronic device further includes an adjusting unit 65 configured to adjust power of each of the first 62 and second 63 communication units based on the distance parameter between the first 62 and second 63 communication units.

In an embodiment of the present disclosure, the electronic device further includes a second determining unit 66 configured to determine whether the distance parameter is larger than or equal to a predetermined threshold or not, so as to obtain a determining result; and a disabling unit 67 configured to disable the first and second communication units if the determining result indicates that the distance parameter is larger than or equal to the predetermined threshold.

Figure 11:
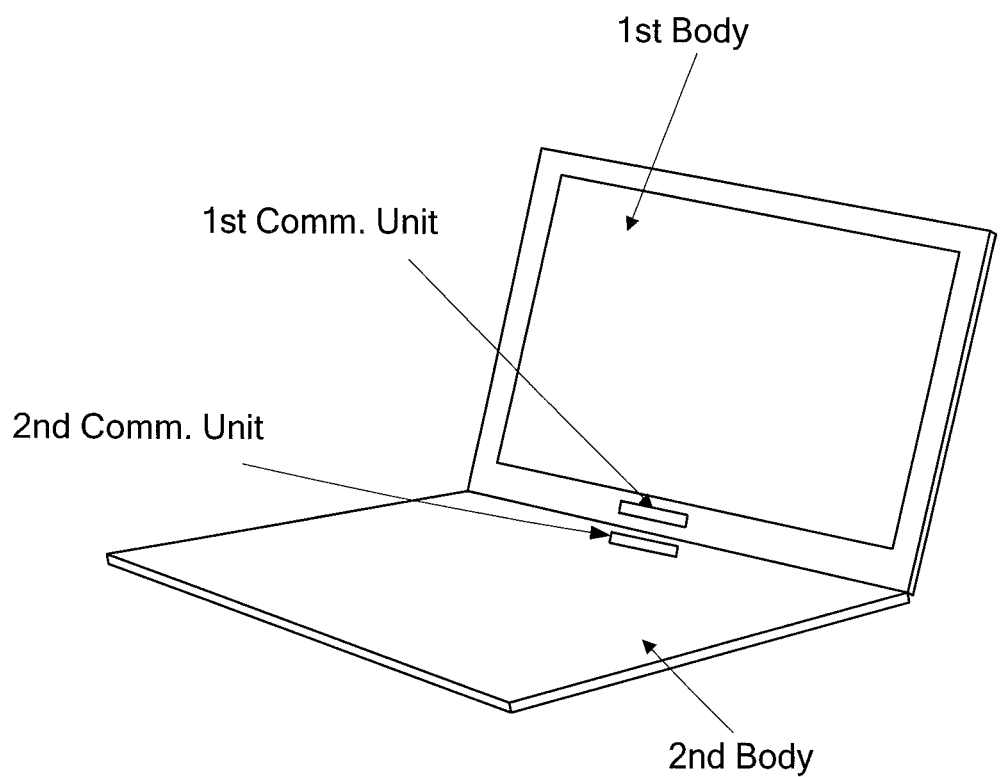
FIG. 11 is a schematic diagram showing a first body and a second body in an electronic device according to an embodiment of the present disclosure.

In an embodiment of the present disclosure, the positional relations between the first and second bodies and between the first and second communication units are shown in FIG. 11. The first communication unit is provided on the first body and the second communication unit is provided on the second body.

It can be appreciated by those skilled in the art that the functions implemented by the respective units of the electronic device shown in FIG. 6 can be understood by referring to the description associated with the above control methods.

Figure 7:
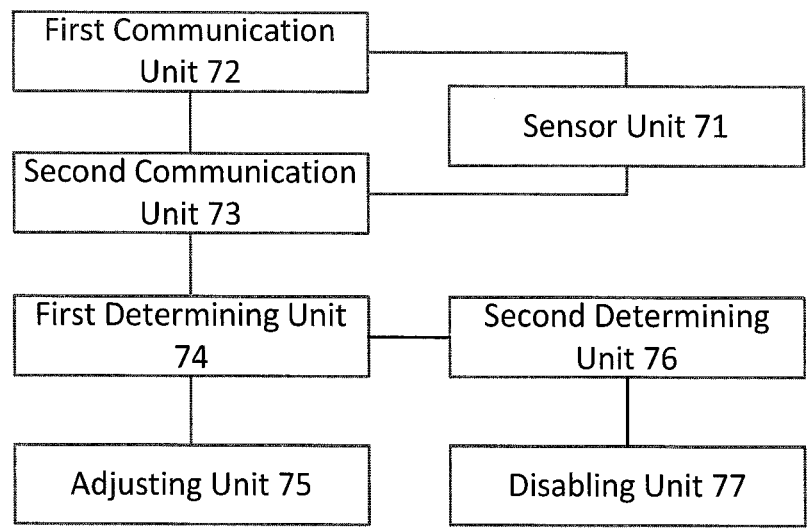
FIG. 7 is a schematic diagram showing a structure of an electronic device according to a second embodiment of the present disclosure.

FIG. 7 is a schematic diagram showing a structure of an electronic device according to a second embodiment of the present disclosure. As shown in FIG. 7, the electronic device includes a first body (not shown), a second body (not shown) and a sensor unit 71. The first body has a first communication unit 72, the second body has a second communication unit 73, and the first body and the second body are capable of communicating with each other via the first 72 and second 73 communication units. A relative position between the first body and the second body is changeable.

The sensor unit 71 is configured to detect a positional relation between the first body and the second body if the relative position between the first body and the second body is changed.

The electronic device further includes a first determining unit 74 configured to determine a distance parameter between the first 72 and the second 73 communication units based on the positional relation.

The electronic device further includes an adjusting unit 75 configured to adjust power of each of the first 72 and second 73 communication units based on the distance parameter between the first 72 and second 73 communication units.

In an embodiment of the present disclosure, the electronic device further includes a second determining unit 76 configured to determine whether the distance parameter is larger than or equal to a predetermined threshold or not, so as to obtain a determining result; and a disabling unit 77 configured to disable the first and second communication units if the determining result indicates that the distance parameter is larger than or equal to the predetermined threshold.

Preferably, the sensor unit 71 is further configured to detect an angle between the first body and the second body if the first body is connectively rotated with respect to the second body.

In an embodiment of the present disclosure, the positional relations between the first and second bodies and between the first and second communication units are shown in FIG. 11. The first communication unit is provided on the first body and the second communication unit is provided on the second body.

It can be appreciated by those skilled in the art that the functions implemented by the respective units of the electronic device shown in FIG. 7 can be understood by referring to the description associated with the above control methods.

Figure 8:
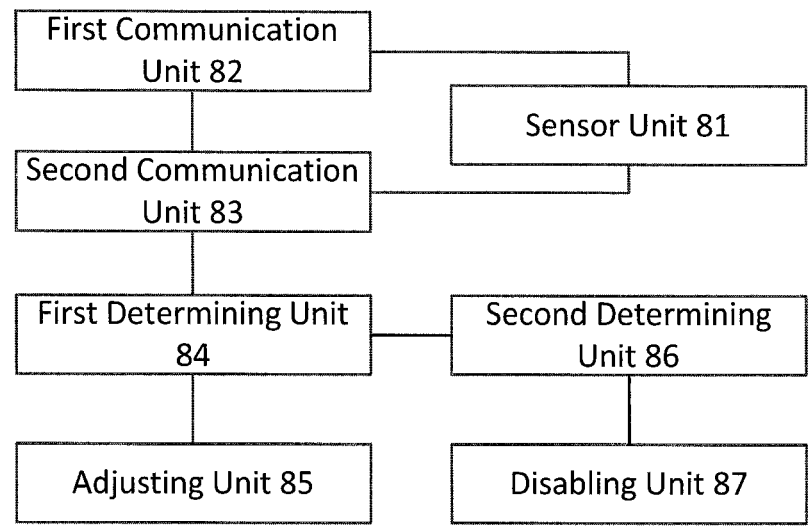
FIG. 8 is a schematic diagram showing a structure of an electronic device according to a third embodiment of the present disclosure.

FIG. 8 is a schematic diagram showing a structure of an electronic device according to a third embodiment of the present disclosure. As shown in FIG. 8, the electronic device includes a first body (not shown), a second body (not shown) and a sensor unit 81. The first body has a first communication unit 82, the second body has a second communication unit 83, and the first body and the second body are capable of communicating with each other via the first 82 and second 83 communication units. A relative position between the first body and the second body is changeable.

The sensor unit 81 is configured to detect a positional relation between the first body and the second body if the relative position between the first body and the second body is changed.

The electronic device further includes a first determining unit 84 configured to determine a distance parameter between the first 82 and the second 83 communication units based on the positional relation.

The electronic device further includes an adjusting unit 85 configured to adjust power of each of the first 82 and second 83 communication units based on the distance parameter between the first 82 and second 83 communication units.

In an embodiment of the present disclosure, the electronic device further includes a second determining unit 86 configured to determine whether the distance parameter is larger than or equal to a predetermined threshold or not, so as to obtain a determining result; and a disabling unit 87 configured to disable the first and second communication units if the distance parameter is larger than or equal to the predetermined threshold.

Preferably, the first body is connected with the second body in a detachable manner, and the sensor unit 81 is further configured to detect the positional relation between the first body and the second body if the first body is detached from the second body.

In an embodiment of the present disclosure, the positional relations between the first and second bodies and between the first and second communication units are shown in FIG. 11. The first communication unit is provided on the first body and the second communication unit is provided on the second body.

It can be appreciated by those skilled in the art that the functions implemented by the respective units of the electronic device shown in FIG. 8 can be understood by referring to the description associated with the above control methods.

Figure 9:
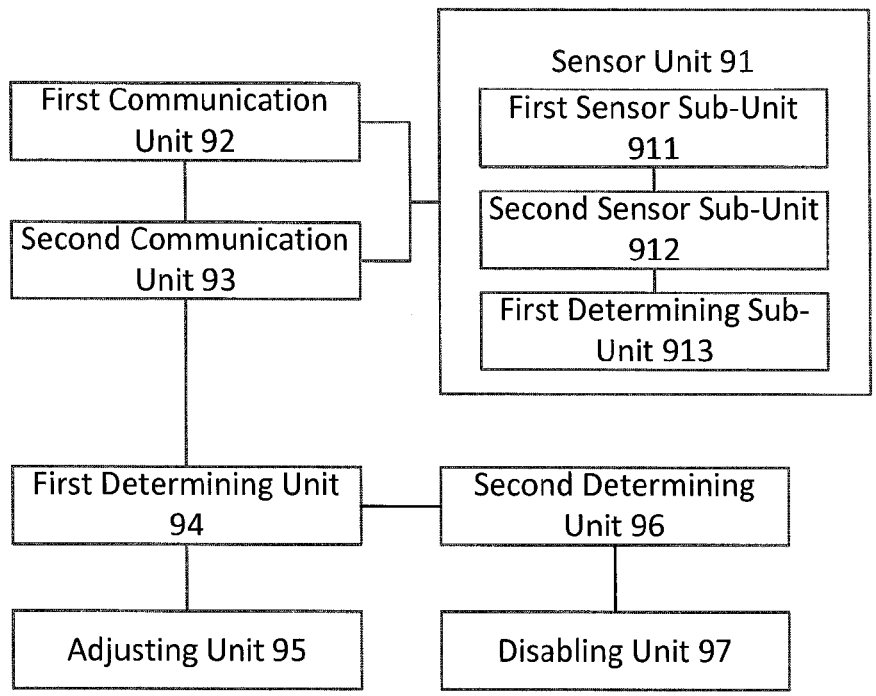
FIG. 9 is a schematic diagram showing a structure of an electronic device according to a fourth embodiment of the present disclosure.

FIG. 9 is a schematic diagram showing a structure of an electronic device according to a fourth embodiment of the present disclosure. As shown in FIG. 9, the electronic device includes a first body (not shown), a second body (not shown) and a sensor unit 91. The first body has a first communication unit 92, the second body has a second communication unit 93, and the first body and the second body are capable of communicating with each other via the first 92 and second 93 communication units. A relative position between the first body and the second body is changeable.

The sensor unit 91 is configured to detect a positional relation between the first body and the second body if the relative position between the first body and the second body is changed.

The electronic device further includes a first determining unit 94 configured to determine a distance parameter between the first 92 and the second 93 communication units based on the positional relation.

The electronic device further includes an adjusting unit 95 configured to adjust power of each of the first 92 and second 93 communication units based on the distance parameter between the first 92 and second 93 communication units.

In an embodiment of the present disclosure, the electronic device further includes a second determining unit 96 configured to determine whether the distance parameter is larger than or equal to a predetermined threshold or not, so as to obtain a determining result; and a disabling unit 97 configured to disable the first and second communication units if the distance parameter is larger than or equal to the predetermined threshold.

Preferably, the sensor unit 91 includes a first sensor sub-unit 911 provided on the first body, a second sensor sub-unit 912 provided on the second body, and a first determining sub-unit 913.

The first sensor sub-unit 911 is configured to detect a first orientation parameter of the first body.

The second sensor sub-unit 912 is configured to detect a second orientation parameter of the second body.

The first determining sub-unit 913 is configured to determine the positional relation between the first body and the second body based on the first and second orientation parameters.

In an embodiment of the present disclosure, the positional relations between the first and second bodies and between the first and second communication units are shown in FIG. 11. The first communication unit is provided on the first body and the second communication unit is provided on the second body.

It can be appreciated by those skilled in the art that the functions implemented by the respective units of the electronic device shown in FIG. 9 can be understood by referring to the description associated with the above control methods.

Figure 10:
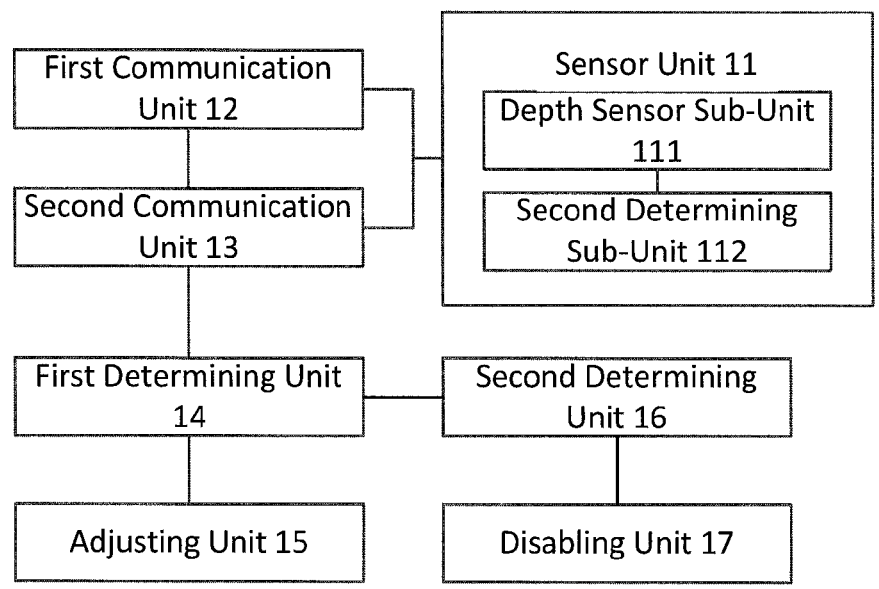
FIG. 10 is a schematic diagram showing a structure of an electronic device according to a fifth embodiment of the present disclosure.

FIG. 10 is a schematic diagram showing a structure of an electronic device according to a fifth embodiment of the present disclosure. As shown in FIG. 10, the electronic device includes a first body (not shown), a second body (not shown) and a sensor unit 11. The first body has a first communication unit 12, the second body has a second communication unit 13, and the first body and the second body are capable of communicating with each other via the first 12 and second 13 communication units. A relative position between the first body and the second body is changeable.

The sensor unit 11 is configured to detect a positional relation between the first body and the second body if the relative position between the first body and the second body is changed.

The electronic device further includes a first determining unit 14 configured to determine a distance parameter between the first 12 and the second 13 communication units based on the positional relation.

The electronic device further includes an adjusting unit 15 configured to adjust power of each of the first 12 and second 13 communication units based on the distance parameter between the first 12 and second 13 communication units.

In an embodiment of the present disclosure, the electronic device further includes a second determining unit 16 configured to determine whether the distance parameter is larger than or equal to a predetermined threshold or not, so as to obtain a determining result; and a disabling unit 17 configured to disable the first and second communication units if the distance parameter is larger than or equal to the predetermined threshold.

Preferably, the sensor unit 11 includes a depth sensor sub-unit 111 and a second determining sub-unit 112.

The depth sensor sub-unit 111 is configured to detect depth information of the second body relative to the first body.

The second determining sub-unit 112 is configured to determine the positional relation between the first body and the second body based on the depth information.

In an embodiment of the present disclosure, the positional relations between the first and second bodies and between the first and second communication units are shown in FIG. 11. The first communication unit is provided on the first body and the second communication unit is provided on the second body.

It can be appreciated by those skilled in the art that the functions implemented by the respective units of the electronic device shown in FIG. 10 can be understood by referring to the description associated with the above control methods.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element may be combined or may be integrated into another system, or some features may be ignored or omitted. In addition, the coupling, direct coupling or communicative connection between various components as shown or discussed may be an indirect coupling or communicative connection via some interface, device or unit and may be electrical, mechanical or in another form.

The units described above as separated may or may not be physically separated. The components shown as units may or may not be physical units. They may be co-located or may be distributed over a number of network elements. Depending on actual requirements, some or all of the units may be selected to achieve the object of the present disclosure.

Further, all the functional units in various embodiments of the present disclosure may be integrated within one processing unit, or each of these units may be a separate unit, or two or more units may be integrated into one unit. Such integrated unit may be implemented in hardware, possibly in combination with software functional units.

It can be appreciated by those skilled in the art that some or all of the steps in the method embodiment as described above may be implemented by hardware following instructions of a program. Such program may be stored in a computer readable storage medium and, when executed, performs the steps of the above method embodiment. The storage medium may be any of various mediums capable of storing program codes, such as a mobile storage device, a Read Only Memory (ROM), a Random Access Memory (RAM), a magnetic disk or an optical disc.

Alternatively, the integrated units of the present disclosure as described above may be implemented as software functional modules and sold or used as standalone produces. In this case, they may be stored in a computer readable storage medium. In view of this, the technical solutions according to the embodiments of the present application, or in other words a part thereof which makes contribution over the prior art, may be substantially embodied in a form of software product. The computer software product may be stored in a storage medium containing instructions which cause a computer device (which may be a personal computer, a server, a network device or the like) to perform one or more methods according to the embodiments of the present application or particular parts thereof. The storage medium may be any of various mediums capable of storing program codes, such as a mobile storage device, a Read Only Memory (ROM), a Random Access Memory (RAM), a magnetic disk or an optical disc.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

While the preferred embodiments of the present disclosure have been described above, the scope of the present disclosure is not limited thereto.

What is claimed is:

1. A method for controlling an electronic device comprising a first body and a second body, wherein the first body and the second body are detachably connected to each other, the method comprising:
   detecting a positional relation between the first body and the second body, when a relative position between the first body and the second body is changed;
   determining a distance parameter between a first communication unit and a second communication unit based on the positional relation, wherein the first communication unit is disposed in the first body and the second communication unit is disposed in the second body; and
   adjusting power of each of the first and second communication units based on the determined distance parameter,
   wherein said adjusting the power comprises:
   increasing the power of each of the first and second communication units when the determined distance parameter indicates that the distance between the first and second communication units is increased; and
   decreasing the power of each of the first and second communication units when the determined distance parameter indicates that the distance between the first and second communication units is decreased.

2. The method of claim 1, wherein said detecting comprises:
   detecting an angle between the first body and the second body when the first body connectively rotates with respect to the second body.

3. The method of claim 1, wherein said detecting comprises:
   detecting the positional relation between the first body and the second body when the first body is detached from the second body.

4. The method of claim 1, further comprising:
   determining whether the distance parameter is larger than or equal to a predetermined threshold; and
   disabling the first and second communication units when the distance parameter is larger than or equal to the predetermined threshold.

5. The method of claim 1, wherein said detecting comprises:
   detecting a first orientation parameter of the first body and a second orientation parameter of the second body; and
   determining the positional relation between the first body and the second body based on the first and second orientation parameters.

6. The method of claim 1, wherein said detecting comprises:
   detecting a depth information of the second body relative to the first body; and
   determining the positional relation between the first body and the second body based on the depth information.

7. An electronic device, comprising:
   a first body, which comprises a first wireless chip;
   a second body, which comprises a second wireless chip, wherein the first body and the second body are detachably connected to each other,
   a sensor, which detects a positional relation between the first body and second body, when a relative position between the first body and the second body is changed; and
   a processor, which determines a distance parameter between the first and second wireless chips based on the positional relation and adjusts power of each of the first and second wireless chips based on the distance parameter,
   wherein said adjusting the power comprises:
   increasing the power of each of the first and second communication units when the determined distance parameter indicates that the distance between the first and second communication units is increased; and
   decreasing the power of each of the first and second communication units when the determined distance parameter indicates that the distance between the first and second communication units is decreased.

8. The electronic device of claim 7, wherein the sensor is further configured to detect an angle between the first body and the second body when the first body connectively rotates with respect to the second body.

9. The electronic device of claim 7, wherein the sensor is further configured to detect the positional relation between the first body and the second body when the first body is detached from the second body.

10. The electronic device of claim 7, wherein the processor further determines whether the distance parameter is larger than or equal to a predetermined threshold; and enables the first and second wireless chips when the distance parameter is larger than or equal to the predetermined threshold.

11. The electronic device of claim 7, wherein the sensor comprises:
   a first sensor provided on the first body, which detects a first orientation parameter of the first body; and
   a second sensor provided on the second body, which detects a second orientation parameter of the second body;
   wherein the processor determines the positional relation between the first body and the second body based on the first and second orientation parameters.

12. The electronic device of claim 7, wherein the sensor comprises:
   a depth sensor, which detects a depth information of the second body relative to the first body;
   wherein the processor determines the positional relation between the first body and the second body based on the depth information.

* * * * *

UNITED STATES PATENT AND TRADEMARK OFFICE
CERTIFICATE OF CORRECTION

PATENT NO. : 9,497,716 B2  
APPLICATION NO. : 14/491213  
DATED : November 15, 2016  
INVENTOR(S) : Liming Wang et al.

Page 1 of 1

It is certified that error appears in the above-identified patent and that said Letters Patent is hereby corrected as shown below:

On the Title Page

(73) Assignees should read: BEIJING LENOVO SOFTWARE LTD., Beijing (CN); LENOVO (BEIJING) LIMITED, Beijing (CN)

Signed and Sealed this  
Fourteenth Day of February, 2017

Michelle K. Lee  
*Director of the United States Patent and Trademark Office*